United States Patent [19]

Mori

[11] Patent Number: 5,835,243
[45] Date of Patent: Nov. 10, 1998

[54] IMAGE PROCESSING APPARATUS AND METHOD

[75] Inventor: Hiroshi Mori, Yokohama, Japan

[73] Assignee: Canon Kabushiki Kaisha, Tokyo, Japan

[21] Appl. No.: 874,577

[22] Filed: Jun. 13, 1997

Related U.S. Application Data

[63] Continuation of Ser. No. 425,189, Apr. 20, 1995, abandoned.

[30] Foreign Application Priority Data

Apr. 28, 1994 [JP] Japan .................. 6-092677

[51] Int. Cl.$^6$ ...................................... G03F 3/08
[52] U.S. Cl. ..................... 358/518; 358/523; 382/167
[58] Field of Search ................. 358/500, 515, 358/518, 534, 538, 523, 524, 447, 448; 382/162, 166, 167; 348/650, 807, 34, 33

[56] References Cited

U.S. PATENT DOCUMENTS

| | | | |
|---|---|---|---|
| 4,929,978 | 5/1990 | Kanamori et al. | 355/38 |
| 4,959,669 | 9/1990 | Haneda et al. | 358/518 |
| 4,970,584 | 11/1990 | Sato et al. | 358/518 |
| 4,977,448 | 12/1990 | Murata | 358/530 |
| 5,014,124 | 5/1991 | Fujisawa | 358/500 |
| 5,019,896 | 5/1991 | Shimazaki | 358/536 |
| 5,121,447 | 6/1992 | Tanioka et al. | 382/50 |
| 5,142,356 | 8/1992 | Usami et al. | 358/80 |
| 5,153,925 | 10/1992 | Tanioka | 382/52 |
| 5,184,214 | 2/1993 | Tatsumi | 358/75 |
| 5,245,444 | 9/1993 | Hashimoto | 358/445 |
| 5,253,048 | 10/1993 | Mori et al. | 358/518 |
| 5,276,459 | 1/1994 | Danzuka et al. | 358/518 |
| 5,293,207 | 3/1994 | Haneda | 358/518 |
| 5,345,320 | 9/1994 | Hirota | 358/518 |
| 5,394,250 | 2/1995 | Shono | 358/532 |
| 5,453,853 | 9/1995 | Sakai et al. | 358/518 |
| 5,497,180 | 3/1996 | Kawakami et al. | 347/131 |
| 5,502,495 | 3/1996 | Bannai et al. | 358/447 |
| 5,589,954 | 12/1996 | Watanabe | 358/518 |

FOREIGN PATENT DOCUMENTS

| | | | |
|---|---|---|---|
| 0369778 | 5/1990 | European Pat. Off. | H04N 1/46 |
| 0518525 | 12/1992 | European Pat. Off. | H04N 1/46 |
| 3129971 | 6/1991 | Japan | H04N 1/40 |

*Primary Examiner*—Kim Yen Vu
*Assistant Examiner*—Madeleine A. V. Nguyen
*Attorney, Agent, or Firm*—Fitzpatrick, Cella, Harper & Scinto

[57] ABSTRACT

A pattern generator generates a color chart which is processed by an image processor and reproduced on a medium by an output device without color correction. Since no color correction is made to the color chart on the medium, the image processing characteristics of the image processor and the output device are reflected in color chart on the medium. The color chart on the medium is read by a reader and converted to color chart read data which is converted to color correction parameters for the output device by a color correction parameter generator. The color correction parameters are stored in a first storage device, and device setting values indicative of characteristics of the output device are stored in a second storage device. When another color image is read by the reader or input by another input device, a color corrector color corrects the color image based on the color correction parameters stored in the first storage device, with the color corrected image then being processed by the image processor, the operational characteristics of which are adjusted in accordance with an operator selected setting value stored in the second storage device. The color corrected and processed image is the output by the output device.

12 Claims, 6 Drawing Sheets

IMAGE PROCESSING APPARATUS AND METHOD

This application is a continuation of application Ser. No. 08/425,189 filed Apr. 20, 1995 abandoned.

BACKGROUND OF THE INVENTION

1. Field of the Invention

The present invention relates to a color image processing apparatus and method, and more particularly, to a color image processing apparatus and method which enables an output device, such as a color facsimile machine, color printer or color copier, to produce optimal output corresponding to color image information.

2. Description of the Related Art

A well-known type of color image processing apparatus with an output device for outputting color image information, such as a personal computer and a color printer, has the configuration shown in FIG. 6, and outputs images according to the following procedure.

A color document is read by a document reader 1 and stores as color image information (R, G and B color signals) in a color image information storage unit 2. Color image information read from the color image information storage unit 2 is subjected by a color corrector 11 to a color correction best-suited to an output device (for example, a color printer) in view of the characteristic of an image output device 5, and converted into C, M and Y color signals. A device setter 12 makes a setting for image processing of an image processor 4 inherent in the output device based on setting values for ink density control and dither pattern selection in binarization which are set by a device setting operator (not shown) in a main body of the output device. The C, M and Y color signals are then subjected to image processing, such as ink density control and binarization, by the image processor 4 for performing image processing inherent in the output device to be converted into C', M' and Y' color signals. The C', M' and Y' color signals are printed on paper by the image output device 5.

The increased level of function of such an output device allows more settings inherent therein, such as fine adjustment and switching of image processing. As setting examples of image processing performed in the output device, ink density control and dither pattern switching in binarization are performed.

However, in the above-mentioned conventional color image processing apparatus, the color correction in view of the characteristic of the output device normally adapts to only a characteristic in a certain specific setting of the output device. For example, in a case in which five ink density settings are possible and error diffusion or dither patterning can be selected for binarization in image processing performed in the output device, and color correction can show the best effect by using error diffusion at an ink density level of 3. If the ink density level is set at 1, a generally low-density image is output, if the ink density level is set at 5, a generally high-density image is output, and if dither patterning is selected for binarization, an output image loses its optimal gradation.

As described above, if the image processing setting condition of the output device itself is changed in the conventional color image processing apparatus, the effects of color correction in view of the characteristic of the output device are not sufficiently obtained. As a result, the user is required, prior to in color image output, to verify in advance whether proper settings have been made for color correction in view of the characteristic of the output device.

Furthermore, in the conventional color image processing apparatus, only one preset color correction is possible for one output device. Therefore, even if various settings, such as ink density control and dither pattern switching for binarization, can be made in image processing performed in the output device, it is impossible to sufficiently make use of the effects of the settings. Furthermore, if changes of the output device with time and the like prevent optimal output in preselected color correction, there is no countermeasure to alleviate the changes.

SUMMARY OF THE INVENTION

An object of the present invention is to provide a color image processing apparatus and method in view of the above problems.

Another object of the present invention is to achieve color correction best-suited to various device settings.

In order to achieve the above objects, according to an aspect of the present invention, there is provided an image processing apparatus comprising a color correction means for making color correction to color image information by using a color correction parameter in accordance with a characteristic and a device setting condition of an output device, an image processing means for performing predetermined image processing according to the device setting condition of the output device, and a storage means for storing the device setting condition and the color correction parameter in relation to each other.

A further object of the present invention is to provide an image processing apparatus and method capable of sufficiently showing the effects of color correction in view of the characteristic of an output device even if an image processing setting condition of the output device itself is changed, generating a color correction parameter in accordance with the setting condition of the output device, and always obtaining an optimal output image even if an output characteristic of the output device varies with time.

Other objects and features of the present invention will become apparent upon reading the following description of the preferred embodiments.

DESCRIPTION OF THE PREFERRED EMBODIMENTS

A detailed description of preferred embodiments of the present invention will now be given in conjunction with the accompanying drawings.

Figure 1:
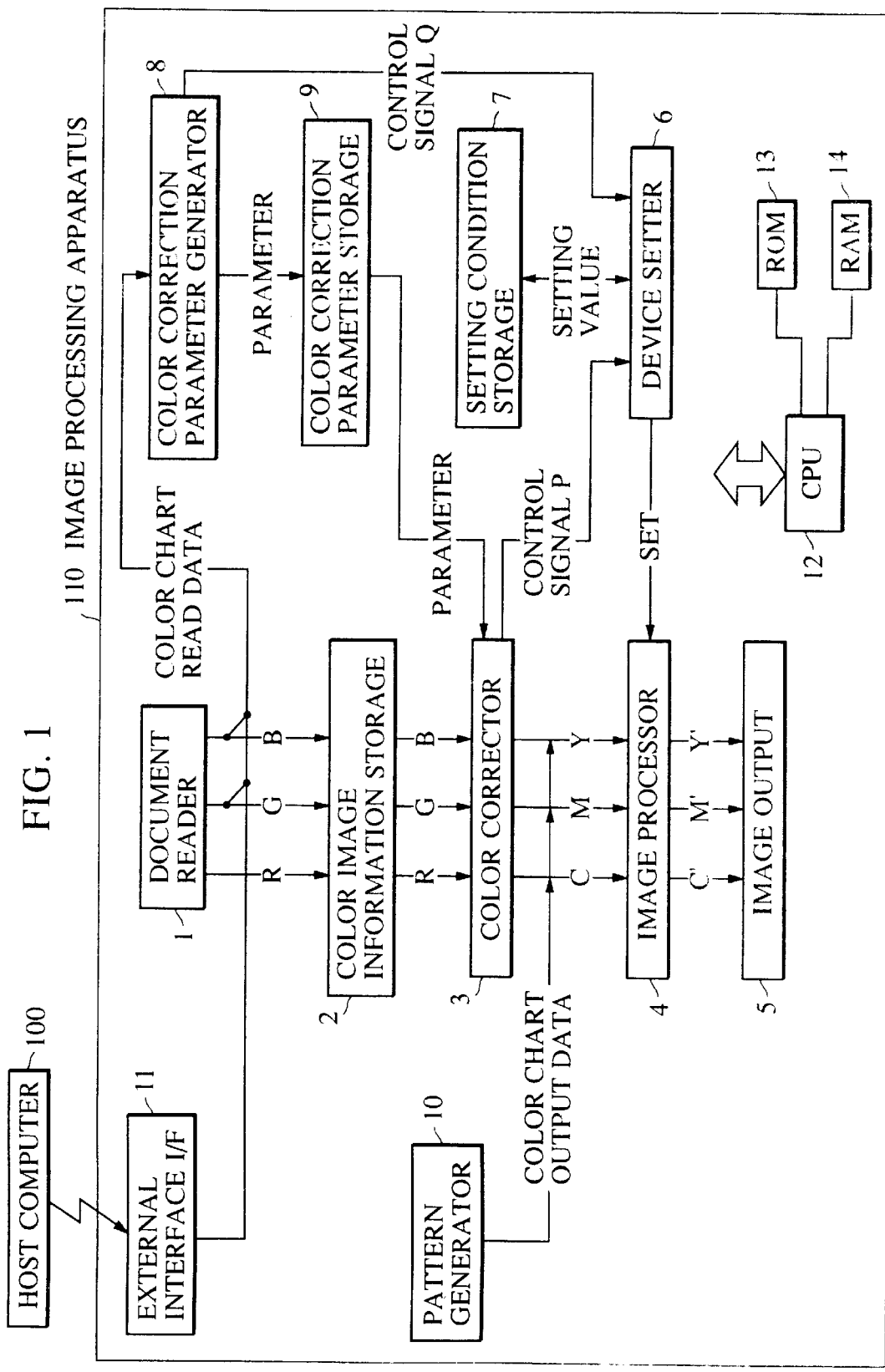
FIG. 1 is a block diagram showing the configuration of an embodiment of the present invention.

FIG. 1 shows a general configuration of a color image processing apparatus 110 according to an embodiment of the present invention.

Referring to FIG. 1, numeral 11 denotes an external interface for inputting color image information from a host computer 100 to the color image processing apparatus 110. The color image processing apparatus 110 comprises a document reader (color scanner) 1 for reading a color document and generating color image information, a color image information storage unit 2 for storing input, such as a photographic image of the color document read from the document reader 1 and a computer graphics (CG) image generated by the computer through a monitor and input from the external interface 11, as color image information (R, G and B color signals), a color corrector 3 for subjecting the color image information read from the color image information storage unit 2 to a color correction best-suited to an output device in view of the characteristics of an image output device 5, an image processor 4 for performing image processing inherent in the output device, such as ink density control and dither pattern switching in binarization, and the image output (color printer) 5 for outputting an image on a recording medium, such as paper, corresponding to the color image information color-corrected by the color corrector 3 and processed by the image processor 4. As the image output device 5, for example, an ink-jet printer mechanism or a color electrophotographic mechanism may be used.

A device setter 6 sets conditions of the above image processing performed by the image processor 4 in accordance with a device setting value set by a device setting operator in a main body of the output device (for example, although not shown, keys on a keyboard, buttons on a control panel or a CD-ROM card) and a device setting value stored in a setting condition storage unit 7. The setting condition storage unit 7 stores the device setting value of the image processor 4 to make the color corrector 3 perform color correction best suited to the output device in view of the characteristics of the image output device 5, and can store a plurality of such device setting values.

Numerals 8, 9 and 10 respectively denote a color correction parameter generator, a color correction parameter storage unit and a pattern generator. The pattern generator 10 generates data on a color chart for color correction parameter generation in C, M and Y signals, and outputs the signals to the image processor 4. The color correction parameter generator 8 makes the image output device 5 output the color chart generated by the pattern generator 10, makes the document reader 1 read the color chart, and generates color correction parameters needed for the color corrector 3 to perform color correction best-suited to the output device in view of the characteristics of the image output device 5, based on obtained color chart read data and color chart output data. The color correction parameter storage unit 9 stores the color correction parameters generated by the color correction parameter generator 8. The color correction parameters are respectively paired with the above device setting values, and the same number of color correction parameters as that of the device setting values are stored in the color correction parameter storage unit 9.

Figure 4:
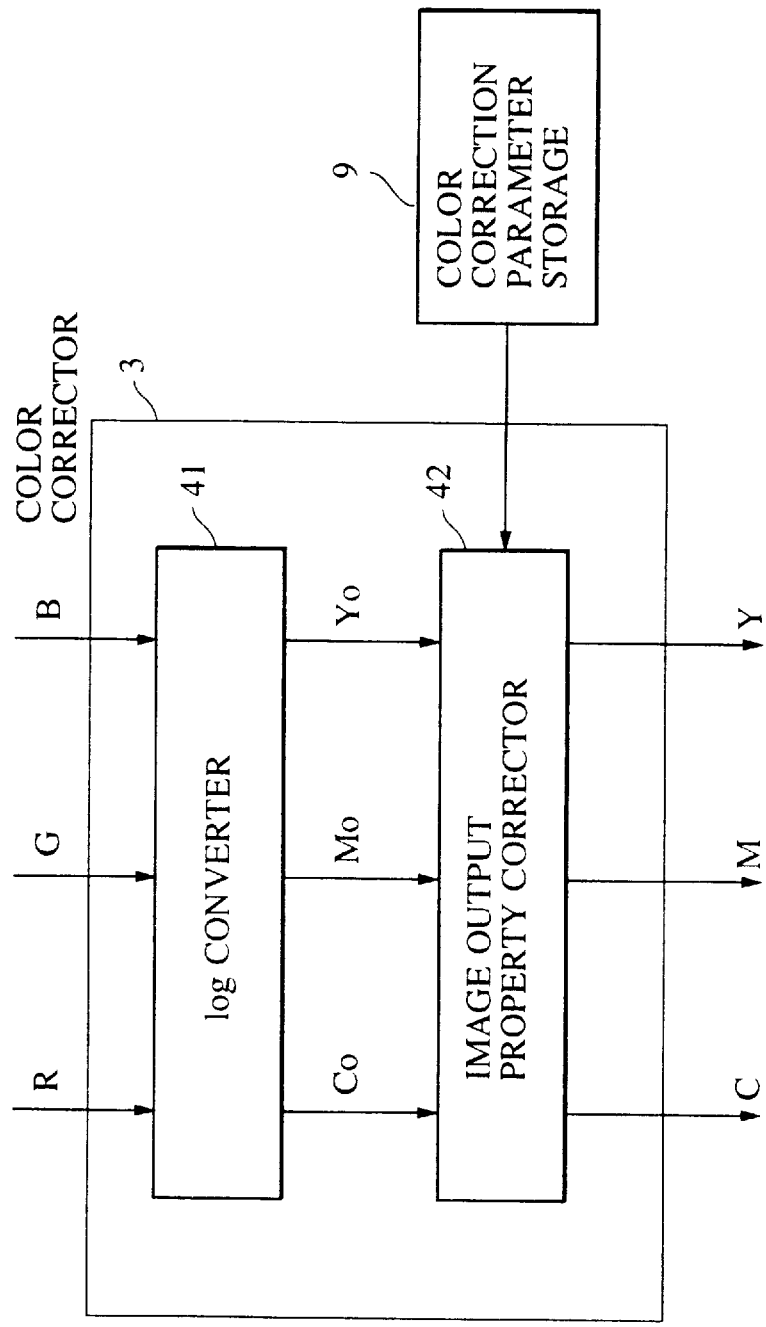
FIG. 4 is a block diagram of a color corrector in the embodiment of the present invention.

The configuration of the color corrector 3 is shown in FIG. 4.

A log converter 41 converts RGB data output from the color image information storage unit 2 into $C_o M_o Y_o$ data, and an image output characteristic corrector 42 outputs CMY data obtained by correction in accordance with the output characteristic of the image output device 5 in the image processing set based on the parameters from the color correction parameter storage unit 9.

The image output characteristic corrector 42 performs, for example, masking using a 3×3 matrix computation or gradation correction.

Figure 5:
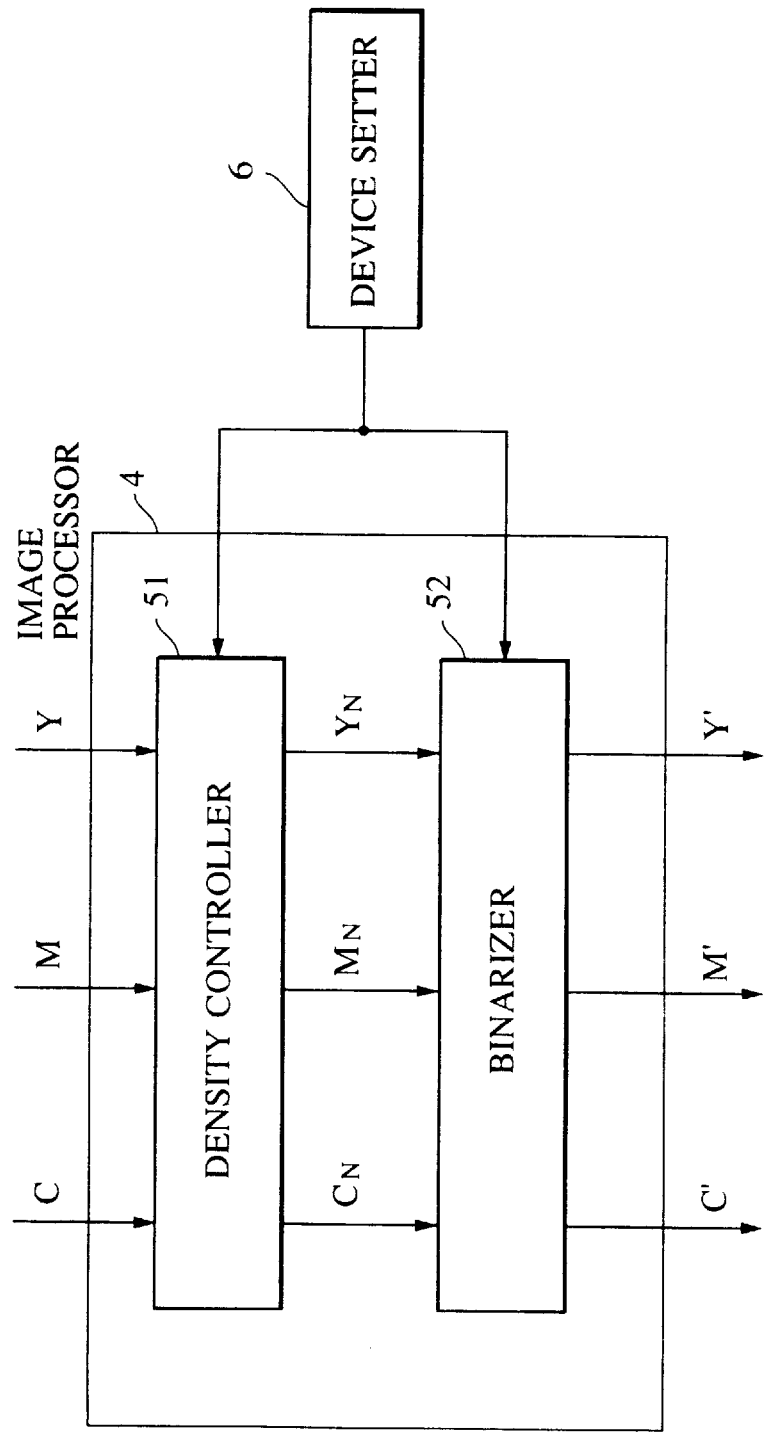
FIG. 5 is a block diagram of an image processor in the embodiment of the present invention.
Figure 6:
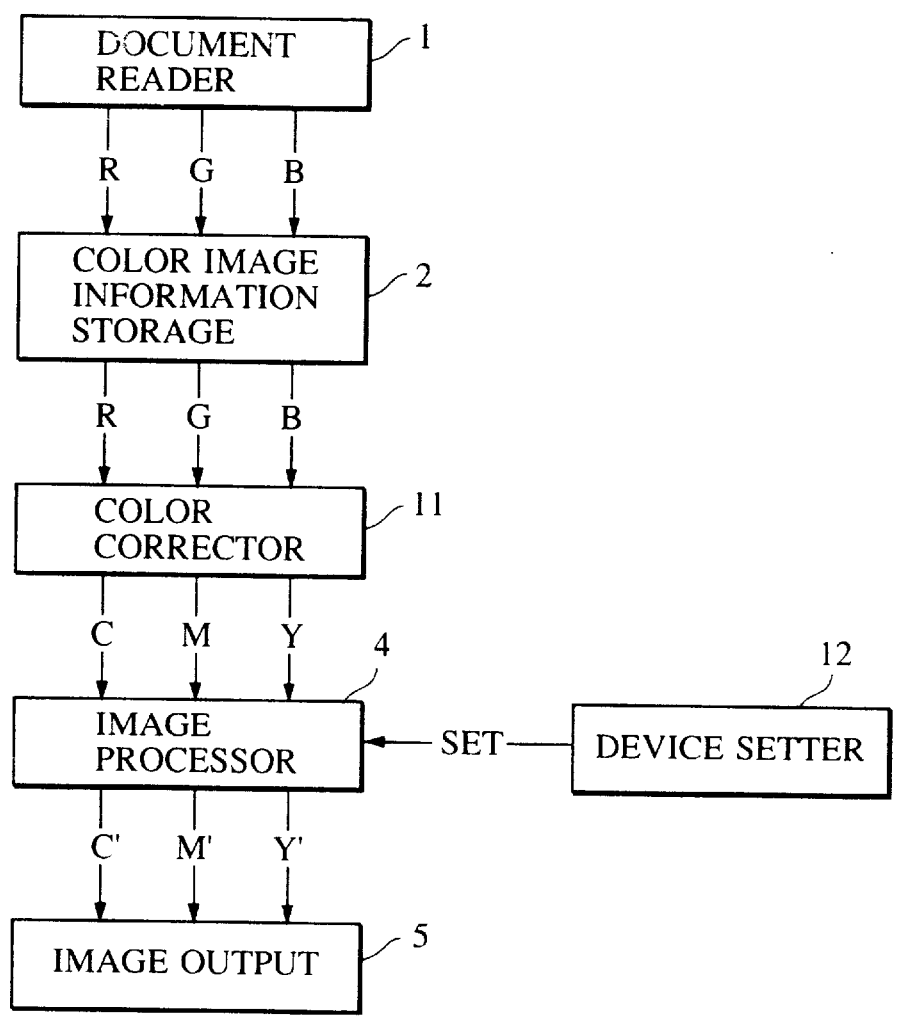
FIG. 6 is a block diagram showing the configuration of a conventional color image processing system.

The configuration of the image processor 4 is shown in FIG. 5.

A density controller 51 performs density control on the CMY data, which is corrected by the color corrector 3 in accordance with the output characteristic of the image output device 5, according to the parameters set by the device setter 6. The density is controlled by γ corrections corresponding to respective C, M and Y colors. A binarizer 52 binarizes $C_N$, $M_N$ and $Y_N$ data obtained by the density control by using dither patterns set by the device setter 6.

The above-mentioned devices are controlled by a CPU 12 by using a RAM 14 as a work memory according to programs stored in a ROM 13.

A color correction parameter generating procedure in the embodiment using the configuration shown in FIG. 1 will now be described with reference to the flowchart of FIG. 2.

A main processing routine is started in response to a command to generate color correction parameters. First, color chart output data is generated by the pattern generator 10, subjected to necessary image processing by the image processor 4, and printed out on paper or the like as a color chart from the image output device 5 (Step S101). Since no color correction is made to the color chart output from the image output device 5, both the image processing characteristic of image processor 4 and the characteristic of the image output device 5 are reflected in the color chart.

The output color chart is read and converted into color chart read data by the document reader 1, and transmitted to the color correction parameter generator 8 (Step S102).

The color correction parameter generator 8 transmits a control signal Q to the device setter 6 on receipt of the color chart read data. In response to the control signal Q, the device setter 6 stores, in the setting condition storage unit 7, an image processing setting of the image processor 4 when this color chart is output (Step S103).

Based on the received color chart read data and color chart output data, the color correction parameter generator 8 generates color correction parameters for color correction best-suited to the output device in view of the characteristic of the image output device 5 in the image processing setting of the image processor 4 when the color chart is output (Step S104).

The color correction parameters generated by the color correction parameter generator 8 are stored in the color correction parameter storage unit 9 (Step S105).

The color correction parameters and the device setting values are respectively stored in the color correction parameter storage 9 and the device setter 6 in correspondence with each other.

The above procedure allows device setting conditions, which are fit for the color corrector 3 to perform color correction according to color correction parameters, to be stored in the setting condition storage 7 when the color correction parameters are generated. A plurality of pairs of color correction parameters and device setting values can be stored by repeating the above procedure several times on arbitrary device setting conditions.

When the image processor 4 performs a plurality of image processes and independently set device setting values for the image processes, color correction parameters are generated corresponding to the plurality of device setting values. In other words, color correction parameters are generated corresponding to the device setting values of the density controller 51 and the device setting values of the binarizer 52 set according to directions from the user.

If no directions are given by the user in image processing, default values are automatically set.

Figure 2:
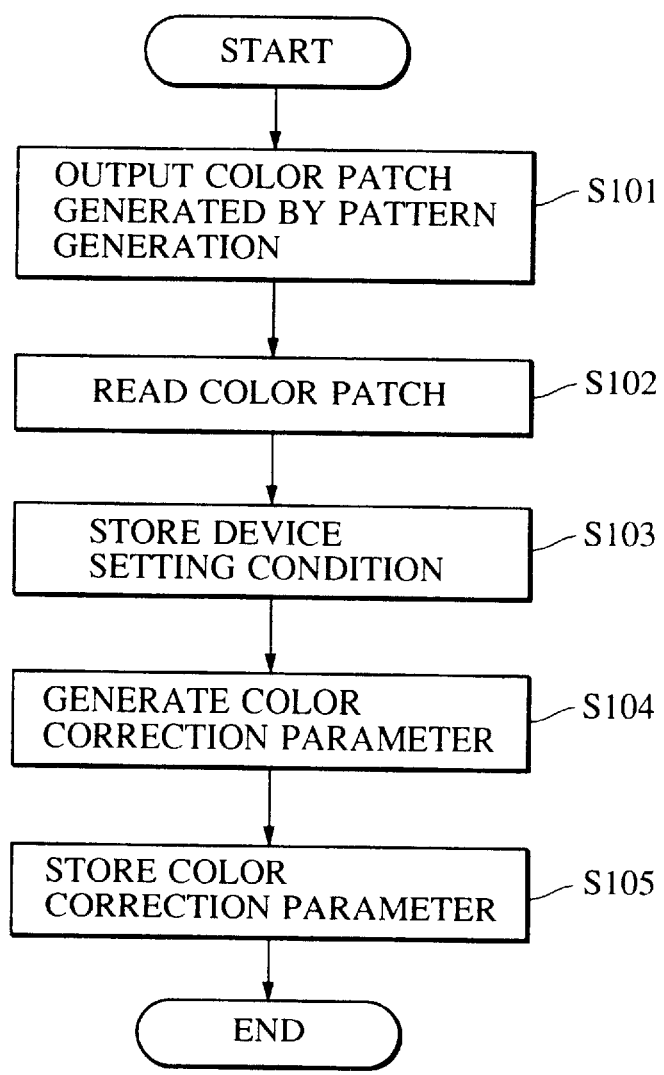
FIG. 2 is a flowchart showing a color correction parameter generating procedure in the embodiment of the present invention.

It is preferable that the operation shown in FIG. 2 be performed not only at shipment of the apparatus, but periodically or freely, for example, at replacement of the image output device 5 and maintenance of the output device, or when required by the user.

A color image output procedure in the embodiment using the configuration shown in FIG. 1 will now be described with reference to the flowchart shown in FIG. 3.

A main processing routine is started in response to an image output start command. A color document is read by the document reader 1, and the read data is temporarily stored in the image information storage unit 2 as color image information (R, G and B color signals) (Step S1).

Figure 3:
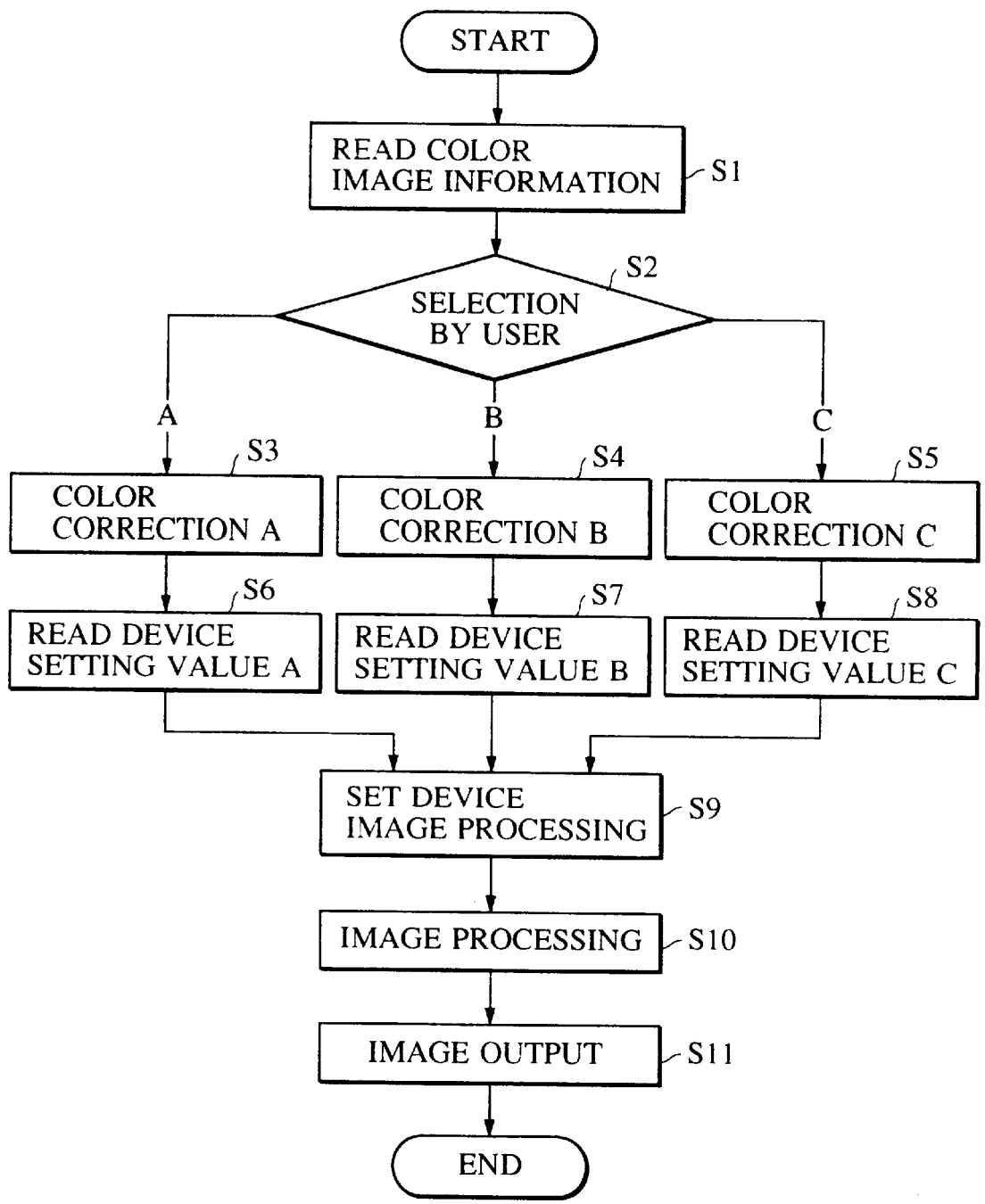
FIG. 3 is a flowchart showing an image output processing procedure in the embodiment of the present invention.

When one of the color correction parameters generated by the above-mentioned color correction parameter generation process is selected according to the device setting made through the operating portion by the user (or one of the parameters is preselected by the user), control is directed to one of branches A, B and C in FIG. 3 according to the selection (Step S2). Subsequently, the color image information read from the image information storage unit 2 is subjected to color correction, which is best-suited to the output device in view of the characteristic of the image input 5 in the color corrector 3 according to the color correction parameter selected from the color correction parameter storage 9 in Step S2, and converted into C, M and Y color signals. At this time, a control signal P identifying the selected color correction parameter is transmitted from the color corrector 3 to the device setter 6 (Step S3, S4 or S5).

The device setter 6 reads the device setting value corresponding to the color correction parameter selected in Step S2 from the setting condition storage 7 with reference to the control signal P (Step S6, S7 or S8), and sets image processing of the image processor 4 inherent in the output device according to the read device setting value (Step S9).

Image processing, such as ink density control and binarization, set by the device setter 6 is applied on the C, M and Y color signals in the image processor 4 for carrying out image processing inherent in the output device, by which the C, M and Y signals are converted into C', M' and Y' color signals (Step S10). These C', M' and Y' color signals are supplied to the image output device 5, which prints out a color image on paper (or cloth or a plastic sheet) (Step S11).

As described above, in this embodiment, color correction parameters best-suited to color correction in view of the type and characteristic of the output device are generated based on the output color chart and stored in the color correction parameter storage unit 9. Furthermore, device setting conditions best-suited to the color correction are set and stored in the setting condition storage unit 7. The output device is automatically adjusted to one of the device setting conditions best-suited to the present color correction based on such stored data. Therefore, an image can be automatically output in the best condition for the present color correction. Furthermore, when the color correction parameters are generated, the device setting conditions fit for color correction using the color correction parameters are stored in the setting condition storage unit 7, by which color correction is allowed to be performed in view of the device characteristic on an arbitrary device setting condition.

[Other Embodiments]

Although R, G and B color signals are output from the color image information storage unit 2 and C', M' and Y' color signals are input to the image output device 5 in the above embodiment, there is no special reason for limiting signals to such signals. These color signals may be replaced with color signals respectively depending on the characteristics of the output device. Similarly, although the color signals are converted from R, G and B into C, M and Y in the color corrector 3, other color signals may be used if color correction is performed in view of the type and characteristics of the output device. Furthermore, although data on a color chart required to generate the color correction parameters is generated by the pattern generator 10 in the above embodiment, the data may be previously stored in a predetermined area of the color image information storage 2, and a. color chart for generating the color correction parameters may be printed out from the image output 5 by using the stored data.

Although color correction is performed according to the color correction parameters generated by the color correction parameter generator 8 in the above embodiment, similar effects to those of the above embodiment can be obtained in the present invention by previously storing a plurality of color correction parameters and a plurality of device setting values respectively in predetermined memories, sequentially pairing the color correction parameters and the device setting values based on the color chart read data and the image processing setting at color chart output, and then selectively using one of the pairs according to the selection of color correction by the user, that is, the selection of the color correction parameter by the user to carry out color correction and image processing.

Furthermore, although color correction and image processing are carried out according to the color correction parameter selected by the user at the color image output (Step S2) in the above embodiment, similar effects can be obtained by performing color correction and image processing using one of the color correction parameters which is automatically selected based on the device setting value selected by the user.

The binarizer 52 in the above embodiment may switch between, for example, the dither method and the error diffusion method.

The image processor 4 may switch between other kinds of image processes, for example, a single color mode and a full-color mode, or a YMC three-color recording mode and a YMCK four-color recording mode.

The present invention may be applied to a system constituted by a plurality of devices, or one apparatus comprising one such device.

The pattern generator 10 may hold a plurality of color chart data corresponding to image processes, for example, color chart data for binarization and color chart data for density control.

Needless to say, the present invention may be applied to a case in which the system or the apparatus is provided with a program for carrying out the present invention.

The image output of the present invention may be applied to a head for jetting droplets by film boiling with heat energy, and a recording method using such head.

The above-mentioned image processing is not limited to ink density control and dither patterning in binarization, and may be related to, for example, the control of the process amount, such as charging voltage, in electrophotography.

As described above, the above embodiments take the following effects.

(1) If the image processing setting condition of an output device itself is changed, it is possible to sufficiently show the effects of color correction in view of the characteristics of the output device. As a result, the user can obtain an optimal color output image without any need to verify in advance whether the device setting is suitable for color correction in view of the characteristics of the output device.

(2) Since color correction parameters can be generated according to the device setting conditions, it is possible to sufficiently make use of the device settings. Furthermore, even if the characteristics of the output device vary with time, color correction can always be performed in view of the characteristics of the device suitable for the output device setting, thereby always obtaining an optimal output image.

The present invention is not limited to the above embodiments, and various variations may be possible within the scope of the appended claims.

What is claimed is:

1. An image processing apparatus comprising:

a memory for storing a plurality of color correction factors in accordance with a plurality of conversion methods;

setting means for setting one of the conversion methods;

color correction means for performing color correction based on a color correction factor which is stored is said memory in accordance with the set conversion method;

conversion means for converting digital image data of M-levels, on which the color correction is performed based on the set conversion method, into digital image data of N-levels, (M>N); and generation means for generating a color correction factor based on an output color chart corresponding to said set conversion method, and storing the generated color correction factor in said memory.

2. An image processing apparatus according to claim 1, further comprising gradation correction means for performing gradation correction to the image data on which the color correction is performed.

3. An image processing apparatus according to claim 2, wherein said setting means sets said conversion method and a condition of said gradation correction based on a manual instruction.

4. An image processing apparatus according to claim 1, wherein said color correction means performs a matrix computation.

5. An image processing apparatus according to claim 1, wherein said conversion means performs binarization.

6. An image processing apparatus according to claim 5, wherein said conversion methods comprise a dither pattern.

7. An image processing apparatus according to claim 5, wherein said conversion methods comprise an error diffusion method.

8. An image processing apparatus according to claim 1, wherein the color correction factors are generated in accordance with an output characteristic of an image output means.

9. An image processing apparatus according to claim 1, wherein said setting means sets said conversion method based on a manual instruction.

10. An image processing apparatus to claim 1, further comprising forming means for forming a color image according to said digital image data of N-levels.

11. An image processing method comprising:

a memory step of storing a plurality of color correction factors in accordance with a plurality of conversion methods;

a setting step of setting one of the conversion methods;

a color correction step of performing color correction based on a color correction factor which is stored in said memory step in accordance with the set conversion method;

a conversion step of converting image data of M-levels, on which the color correction is performed based on the set conversion method, into digital image data of N-levels (M>N); and a generation step of generating a color correction factor based on an output color chart corresponding to said set conversion method, and storing the generated color correction factor.

12. An image processing method of performing a color process based on a manual instruction, comprising:

a memory step of storing a plurality of color correction factors corresponding to a plurality of color processes;

an instruction step of instructing a desired color process manually;

a color correction step of performing color correction in accordance with an output characteristic of an image output device based on a color correction factor corresponding to the desired color process;

a color conversion step of performing the desired color process to the image data on which the color correction is performed; and a generating step of generating the color correction factor based on an output color chart corresponding to a color process, and storing the generated color correction factor in said memory step so as to correspond to the color process.

* * * * *

UNITED STATES PATENT AND TRADEMARK OFFICE
CERTIFICATE OF CORRECTION

PATENT NO. : 5,835,243
DATED : November 10, 1998
INVENTOR(S) :
HIROSHI MORI

It is certified that error appears in the above-identified patent and that said Letters Patent is hereby corrected as shown below:

COLUMN 1 line 23,    "stores" should read --stores it--;
    line 55,    "and" should be deleted; and
    line 67,    "to in" should read --in--.

COLUMN 4 line 54,    "7" should read --unit 7--.

COLUMN 5 line 25,    "input" should read --output unit--;
    line 28,    "9" should read --unit 9--; and
    line 34,    "7" should read --unit 7--.

Signed and Sealed this

Twenty-ninth Day of June, 1999

Attest:

Q. TODD DICKINSON

*Attesting Officer*      *Acting Commissioner of Patents and Trademarks*